Figure 1:
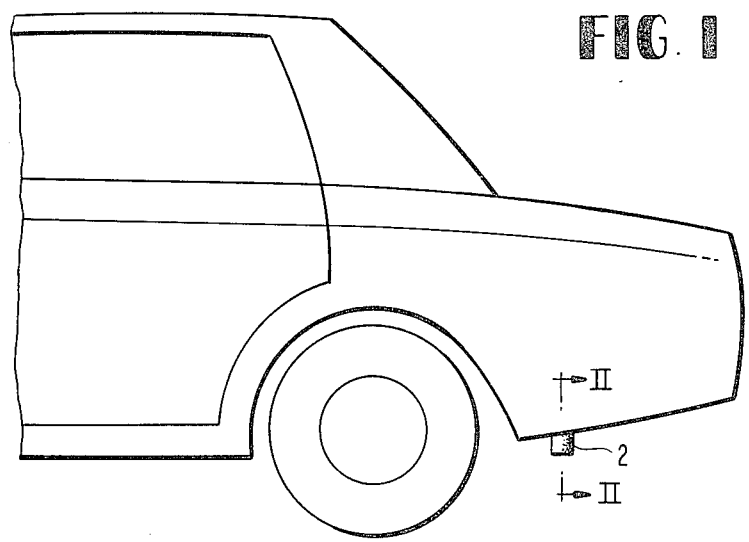

United States Patent [19]

Schulz et al.

[11] 4,176,877

[45] Dec. 4, 1979

[54] WATER DRAINAGE SPOUT, ESPECIALLY FOR HOLLOW SPACES IN MOTOR VEHICLE STRUCTURES

[75] Inventors: Manfred Schulz, Wildberg; Gudrun Kappler, Oberreichenbach, both of Fed. Rep. of Germany

[73] Assignee: Daimler-Benz Aktiengesellschaft, Fed. Rep. of Germany

[21] Appl. No.: 847,494

[22] Filed: Nov. 1, 1977

[30] Foreign Application Priority Data

Nov. 5, 1976 [DE] Fed. Rep. of Germany ....... 2650679

[51] Int. Cl.$^2$ ............................................ B62D 25/00
[52] U.S. Cl. .................................... 296/208; 296/154
[58] Field of Search ................. 296/28 R, 154, 137 R; 49/476; 239/288.5; 137/354

[56] References Cited

U.S. PATENT DOCUMENTS

| 3,382,889 | 5/1968 | Heinz et al. ...................... 296/154 X |
| 4,071,273 | 1/1978 | Hack et al. ......................... 296/154 |

*Primary Examiner*—Joseph F. Peters, Jr.
*Assistant Examiner*—Gene A. Church
*Attorney, Agent, or Firm*—Craig and Antonelli

[57] ABSTRACT

A water drainage spout, especially for hollow spaces in motor vehicle structures, which is so arranged that any water present in the hollow spaces is able to flow off by gravity when the vehicle stands still or drives, and in which the area serving the water drainage is surrounded on its side facing the atmosphere by a circumferential apron; the area serving the water drainage is constructed funnel-shaped and is closed off by a bottom adapted to be pushed through while water discharge openings are provided in the wall of the funnel distributed over the circumference thereof, which extend to this bottom.

11 Claims, 3 Drawing Figures

U.S. Patent     Dec. 4, 1979     4,176,877

WATER DRAINAGE SPOUT, ESPECIALLY FOR HOLLOW SPACES IN MOTOR VEHICLE STRUCTURES

The present invention relates to a water drainage spout, especially for hollow spaces in motor vehicle structures, which is so arranged that water present in the hollow spaces flows off as a result of gravity influence when the vehicle stands still and when it is driven, and in which the area serving for the water drainage is surrounded on its side facing the atmosphere by a circumferential apron.

Such a water drainage spout is already disclosed in the German Offenlegungsschrift No. 24 60 428 which corresponds to U.S. Pat. No. 4,071,273. This prior art spout includes a central water drainage opening and the dimensions of the apron surrounding the same are so selected that no splashing water can enter from the outside into the drainage opening during the drive by reason of the then existing pressure conditions.

The present invention is concerned with the task to so further develop a water drainage spout of the aforementioned type that it can also be used if additionally a hose or the like serving the forced drainage of another structural part has to be conducted into the atmosphere.

The underlying problems are solved according to the present invention in that the area serving the water drainage is constructed funnelshaped and is closed off by a bottom adapted to be pushed through, and in that water outlet openings are provided in the wall of the funnel distributed over the circumference thereof, which extend in the downward direction to the bottom.

An entry of dust or the like can be prevented according to a further feature of the present invention in that lamellae are provided within the area of the openings, which are each securely connected with the upper edge of the opening.

The dimensions of the apron are preferably so selected that the ratio of the inner width of the apron to the diameter of the bottom is of the order of magnitude of 6:1 and the ratio of the height of the apron to the diameter of the bottom is of the order of magnitude of 4:1.

Accordingly, it is an object of the present invention to provide a water drainage spout, especially for hollow spaces in motor vehicle structures, which avoids by simple means the aforementioned shortcomings and drawbacks encountered in the prior art.

Another object of the present invention resides in a water drainage spout which can also be utilized for the forced drainage of other structural parts of a motor vehicle.

A further object of the present invention resides in a water drainage spout in which the entry of dust or the like from the outside can be effectively prevented by simple means.

A still further object of the present invention resides in a water drainage spout, especially for hollow spaces in motor vehicle structures, which operates reliably under all driving conditions that may occur with the vehicle.

Figure 2:
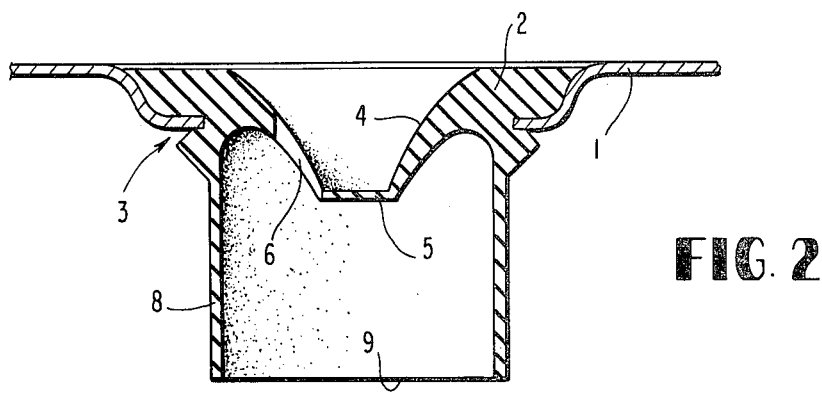
Figure 3:
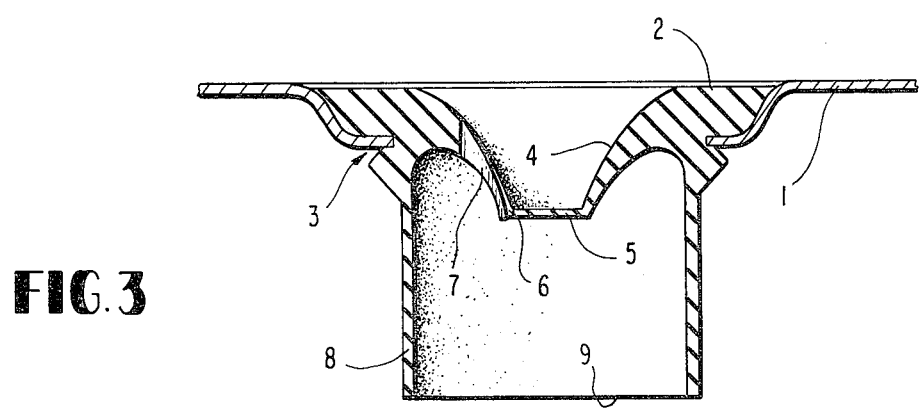

These and other objects, features and advantages of the present invention will become more apparent from the following description when taken in connection with the accompanying drawing which shows, for purposes of illustration only, two embodiments in accordance with the present invention, and wherein:

FIG. 1 is a schematic side elevational view of the rear part of a passenger motor vehicle illustrating the arrangement of a water drainage spout according to the present invention in a depression or trough of the luggage space floor of a passenger motor vehicle;

FIG. 2 is a cross-sectional view, on an enlarged scale, through a water drainage spout in accordance with the present invention, taken along line II—II of FIG. 1; and FIG. 3 is a cross-sectional view, corresponding to FIG. 2, through a modified embodiment of a water drainage spout in accordance with the present invention provided with additional lamellae within the area of the water discharge openings.

Referring now to the drawing wherein like reference numerals are used throughout the various views to designate like parts, at the lowest place of a depression or trough (not illustrated in detail), a water drainage spout 2 is secured in an opening of the sheet-metal body panel 1 by way of a circumferential groove 3. The water drainage spout 2 includes an area 4 tapering funnel-shaped in the downward direction, which is closed off in the downward direction by a bottom 5 adapted to be pushed through in case of need. Several water outlet or discharge openings 6 are arranged in the wall of the funnel-shaped area 4, distributed over the circumference, which terminate in the downward direction at the height of the bottom 5. These water discharge openings 6 which—as shown in FIG. 3 of the drawing—may additionally be provided with elastic lamellae 7 for the protection against entry of dust or the like, serve the drainage of the trough or depression, not illustrated in detail. In case additionally the forced drainage of another structural part, such as, for example, of an antenna or of a tank-filler connection trough is necessary by way of a hose or the like, the bottom 5 of the water drainage spout 2 can be pushed through and the hose can thus be extended to the outside through the thus-resulting opening.

The area of the water drainage spout 2 serving the water discharge is surrounded on its side facing the atmosphere by a circumferential apron 8 whose dimensions assume particular significance.

This is so as the drainage functions during the drive normally only as long as a pressure drop exists from the inside toward the outside which is the case with a closed vehicle and with an opened ventilation system since the outside pressure is then slightly negative; a discharge velocity results thereby at the openings 6 which is dependent on the driving velocity but is relatively slight.

If now the interior pressure becomes very much lower than the outside pressure by the opening of the sliding roof or of a side window, then a relatively high suction velocity is produced at the opening 6 as a result of this reversed pressure drop which, however, is far-reachingly reduced by the cross-sectional enlargement within the area of the larger opening 9 surrounded by the apron 8. Whereas the openings 6 are dimensioned according to the amount of water to be expected and to be experimentally determined, the other dimensions of the water drainage spout 2 are determined in wind tunnel tests.

The cross section of the opening 9 has to be thereby so dimensioned that with the highest possible vacuum in the passenger space, which results with an opened sliding roof and with a closed ventilation system, such a low velocity results in the lower area of the opening 9 up to driving velocities of about 150 km/h that no splash or spray water can be torn upwardly through the opening 9. Cross-section ratios for the opening 9 and the bottom 5 of about 6:1 result therefrom.

This distance between the discharge areas of the openings 6 and 9 is also determined from tests in the wind tunnel—taking into consideration the entire spout length which is determined also by the tilt or shape angle of a vehicle. This distance must be so large that the high suction velocity at 6 leads to a velocity profile in the lower area of the opening 9 which is uniform at least to some extent. A ratio of about 4:1 is necessary therefor.

The wall thickness and the material of the spout—which may be of rubber or synthetic resinous material—are obtained from the requirement that the spout not be deformed by the dynamic air pressure and by the occurring splash or spray water.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. In a water discharge nozzle for hollow spaces of vehicle structures of the type having a means for preventing penetration of water from the exterior of the nozzle through a discharge opening of the nozzle which includes a unitary structure forming said nozzle and an apron means surrounding the nozzle and extending therebelow, the improvement wherein said unitary structure comprises a generally frusto-conical shaped depression having a peripheral wall and a closed circular vertex, a hollow cylindrically-shaped extension surrounding said depression and forming said apron, and discharge opening means formed in said depression above said vertex in a portion of the peripheral wall facing said extension and adjacent said vertex, and wherein said vertex is constructed so as to separate from said peripheral wall by pushing thereagainst.

2. A water drainage spout according to claim 1, characterized in that said water discharge opening means are arranged in wall portions of the defussion distributed over the circumference thereof.

3. A water drainage spout according to claim 2, characterized in that the spout is for hollow spaces in motor vehicle structures.

4. A water drainage spout according to claim 2, characterized in that lamellae means are provided within the area of the opening means which are each securely connected with the upper edge of the opening means.

5. A water drainage spout according to claim 4, characterized in that the ratio of inner width of the apron means to the diameter of the vertex is of the order of magnitude of about 6:1.

6. A water drainage spout according to claim 5, characterized in that the ratio of the height of the apron means to the diameter of the vertex is of the order of magnitude of about 4:1.

7. A water drainage spout according to claim 6, characterized in that the spout is for hollow spaces in motor vehicle structures.

8. A water drainage spout according to claim 1, characterized in that the ratio of the height of the apron means to the diameter of the bottom means is of the order of magnitude of about 4:1.

9. A water drainage spout according to claim 1, characterized in that the ratio of inner width of the apron means to the diameter of the vertex is of the order of magnitude of about 6:1.

10. A water drainage spout according to claim 9, characterized in that the ratio of the height of the apron means to the diameter of the vertex is of the order of magnitude of about 4:1.

11. A water drainage spout according to claim 1, characterized in that lamellae means are provided within the area of the opening means which are each securely connected with the upper edge of the opening means.

* * * * *